United States Patent
Shinata

(10) Patent No.: US 7,040,468 B2
(45) Date of Patent: May 9, 2006

(54) HYDRAULIC SHOCK ABSORBER

(75) Inventor: Ryo Shinata, Kanagawa-ken (JP)

(73) Assignee: Kabushiki Kaisha Hitachi Seisakusho, Tokyo (JP)

( * ) Notice: Subject to any disclaimer, the term of this patent is extended or adjusted under 35 U.S.C. 154(b) by 0 days.

(21) Appl. No.: 10/646,780

(22) Filed: Aug. 25, 2003

(65) Prior Publication Data

US 2004/0069581 A1   Apr. 15, 2004

(30) Foreign Application Priority Data

Sep. 30, 2002   (JP) .............................. 2002/287951

(51) Int. Cl.
*F16F 9/348* (2006.01)

(52) U.S. Cl. .................. 188/322.15; 188/282.6

(58) Field of Classification Search ............. 188/282.1, 188/282.5, 282.6, 322.15, 322.22
See application file for complete search history.

(56) References Cited

U.S. PATENT DOCUMENTS

| | | | | |
|---|---|---|---|---|
| 3,003,594 A | * | 10/1961 | Carbon | 188/317 |
| 3,827,538 A | * | 8/1974 | Morgan | 188/319.1 |
| 4,060,155 A | * | 11/1977 | Duckett | 188/282.6 |
| 4,121,704 A | * | 10/1978 | Nicholls | 188/282.6 |
| 4,512,447 A | * | 4/1985 | Miura | 188/282.6 |
| 4,834,222 A | * | 5/1989 | Kato et al. | 188/280 |
| 4,964,493 A | * | 10/1990 | Yamaura et al. | 188/282.6 |
| 4,993,524 A | * | 2/1991 | Grundei et al. | 188/282.6 |
| 5,259,294 A | * | 11/1993 | May | 92/181 P |
| 5,316,113 A | * | 5/1994 | Yamaoka | 188/282.6 |
| 6,148,853 A | * | 11/2000 | Wang | 137/493.6 |

FOREIGN PATENT DOCUMENTS

JP        58-94929        6/1983

* cited by examiner

Primary Examiner—Christopher P. Schwartz
(74) Attorney, Agent, or Firm—Wenderoth, Lind & Ponack, L.L.P.

(57) ABSTRACT

A hydraulic shock absorber includes a cylindrical housing within which a piston assembly is slidably received. The piston assembly includes a piston element connected to a piston rod and adapted to divide an interior of the housing into compression and rebound chambers. The piston element has compression and rebound passages to provide fluid communication between the compression and rebound chambers. A valve assembly includes a first valve disc positioned on a lower side of the piston element, and a second valve disc retained on the first valve disc. The second valve disc includes apertures arranged in a circumferentially spaced relationship and are selectively openable and closeable by the first valve disc. A third valve disc is retained on the second valve disc and has notches arranged in a circumferentially spaced relationship. The notches cooperate with the apertures to collectively form ports. The ports are communicated with the compression chamber. A fourth valve disc cooperates with the second valve disc to sandwich the third valve disc so that restrictive orifices are defined in an outer end of the notches. Each of the ports has a cross sectional area greater than that of the restrictive orifices regardless of a relative angular position between the second and third valve discs.

6 Claims, 13 Drawing Sheets

HYDRAULIC SHOCK ABSORBER

BACKGROUND OF THE INVENTION

The present invention relates to hydraulic shock absorbers for motor vehicles and other vibratory objects and more particularly, to an improved piston assembly for use in a hydraulic shock absorber.

Automotive shock absorbers of the fluid damper type have been in use for many years. Japanese laid-open utility model publication No. 58-94929 discloses a hydraulic shock absorber wherein a valved piston is fit around a piston rod and reciprocatingly received within a cylindrical housing (see FIG. 14). The piston divides an interior of the cylindrical housing into an upper, rebound chamber and a lower, compression chamber. A valve assembly is mounted to a lower surface of a piston head and includes an apertured valve disc (see FIG. 15) normally seated on a valve seat, and a notched valve disc (see FIG. 16) superimposed on the apertured valve disc and adapted to cooperate with the apertured valve disc to collectively form a plurality of ports. An annular outer valve disc (see FIG. 17) cooperates with the apertured valve disc to sandwich the notched valve disc to form a plurality of restrictive orifices in an end of the notches of the nothced valve disc. An annular inner valve disc (see FIG. 18) is placed on the apertured valve disc to normally close off the ports.

During a rebound stroke, the piston is moved upwardly into the rebound chamber. Resultant pressure increase in the rebound chamber opens the valve assembly to allow damping fluid to flow from the rebound chamber to the compression chamber through a plurality of rebound passages which are formed in the piston head. During a compression stroke, the piston is moved downwardly into the compression chamber. Pressure differential across the valve assembly causes the inner valve disc to deflect to thereby open the ports. This valve arrangement enables the shock absorber to provide a greater damping force at relatively low compression rates.

The apertured valve disc is formed with a C-shaped aperture (see FIG. 15). A problem with this arrangement is that during a rebound stroke, the inner valve disc is caused to deflect along the C-shaped aperture of the apertured valve disc due to a build-up of back pressure above the piston (as shown by broken line in FIG. 14). A degree of deflection becomes larger as the piston is moved faster. Due to repeated flexing of the inner valve disc in response to fluid flow during compression and rebound movement of the piston, the inner valve disc is prone to plastic deformation or fatigue failure. In order for the inner valve disc to resist back pressure, the inner valve disc could be made thicker, or another annular disc valve could be superimposed on the inner valve disc. However, such arrangements make it difficult to establish a desired tuning of the shock absorber during a low velocity compression stroke.

Accordingly, it is an object of the present invention to provide a hydraulic shock absorber which prevents excessive deflection of an inner valve disc due to back pressure while establishing desired tuning of the shock absorber.

SUMMARY OF THE INVENTION

According to the present invention, there is provided a hydraulic shock absorber which includes a cylindrical housing filled with damping fluid, a piston slidably disposed within the cylindrical housing to divide an interior of the cylindrical housing into an upper working chamber and a lower working chamber, a passage extending between the upper and lower working chambers and adapted to allow the damping fluid to flow therethrough during movement of the piston, a valve seat located in a downstream end of the passage, and a valve assembly normally seated on the valve seat and operable to selectively open and close the passage. The valve assembly includes a first valve disc held on the valve seat, a second valve disc retained on the first valve disc and including a plurality of circular apertures arranged in a circumferentially spaced relationship and selectively openable and closeable by the first valve disc, and a third valve disc retained on the second valve disc and having a plurality of notches arranged in a circumferentially spaced relationship. The notches cooperate with the apertures to form a plurality of ports which are communicated with one of the chambers which is located downstream of the valve seat. A fourth valve disc cooperates with the second valve disc to sandwich the third valve disc so that a plurality of restrictive orifices are defined in an outer end of the notches. The ports each have a cross sectional area greater than that of the restrictive orifices regardless of a relative angular position between the second and third valve discs.

With this arrangement, an area of the ports defines an orifice-induced damping characteristic. Advantageously, a portion of the second valve disc which is positioned between adjacent apertures supports the first valve disc to prevent undue flexing of the first valve disc when back pressure is exerted on the first valve disc.

The apertures of the second valve disc may preferably be circular in shape. When back pressure is exerted on the first valve disc, resultant stress can be evenly dispersed along and around circumferences of the circular apertures. This results in an increase in service life of the first valve disc and thus, the overall shock absorber. All the apertures of the second valve disc may preferably be communicated with all the notches of the third valve disc. This arrangement allows the first valve disc to have a constant area on which fluid pressure is exerted and thus, reduces or minimizes damping fluctuations particularly during a low velocity compression stroke.

The above and other objects, features and advantages of the present invention will become apparent from the following detailed description of the preferred embodiments of the invention.

DETAILED DESCRIPTION OF THE PREFERRED EMBODIMENTS

Figure 1:
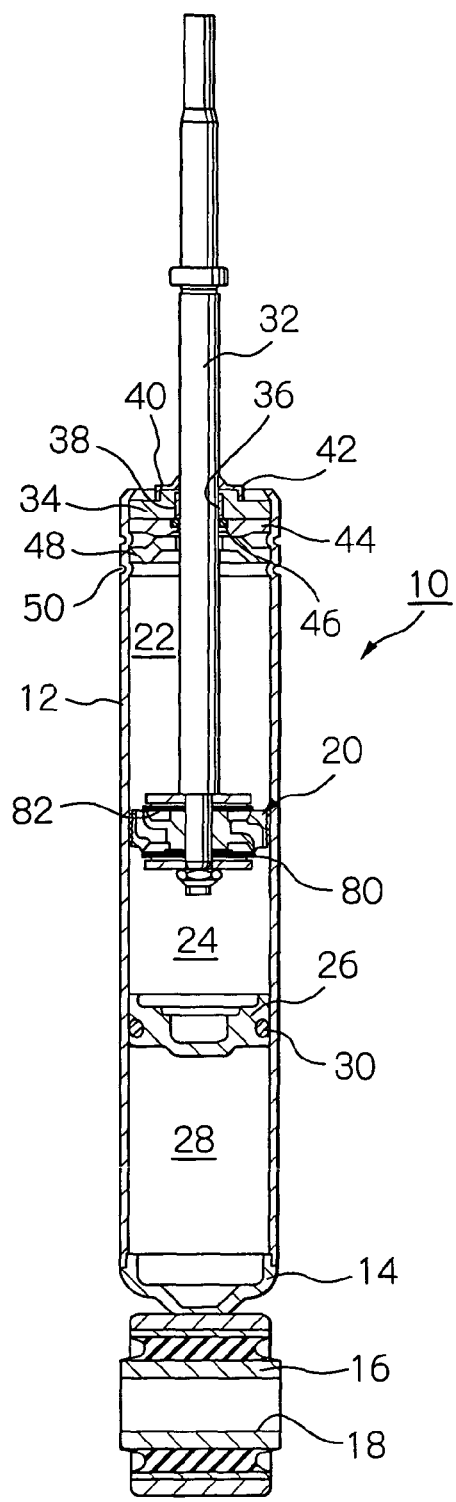
FIG. 1 is an elevational sectional view of a hydraulic shock absorber assembled according to one embodiment of the present invention.

Referring first to FIG. 1, there is illustrated a hydraulic shock absorber, generally indicated by reference numeral 10, for use in a motor vehicle. The shock absorber 10 includes a cylindrical housing 12 filled with damping fluid. A lower end of the cylindrical housing 12 is closed by a cup-shaped closure member 14. An end mounting 16 is welded or otherwise secured to the closure member 14. The end mounting 16 has a transverse opening 18 for mounting a lower end of the shock absorber 10 on a wheel axle (not shown).

A piston assembly is generally indicated by reference numeral 20 and slidably disposed within the cylindrical housing 12. The piston assembly 20 divides an interior of the housing 12 into an upper working or rebound chamber 22 and a lower working or compression chamber 24. A free piston 26 is also disposed within the compression chamber 24 to form a gas chamber 28 below the free piston 26. The gas chamber 28 is filled with high pressure gas. An O-ring 30 extends around a circumference of the free piston 26 to provide a fluid seal between the compression chamber 24 and the gas chamber 28.

A piston rod 32 has one end connected to the piston assembly 20. Another end of the piston rod 32 extends upwardly out of the housing 12. An annular piston rod guide 34 is fit within an upper end of the housing 12. The piston rod guide 34 has an opening 36 to slidably receive and guide the piston rod 32 through a bushing 38. The piston rod guide 34 has an annular projection 40 on its upper surface. A dust cover 42 is fit over the annular projection 40 to prevent entry of dust and other foreign matter into the interior of the housing 12. A ring 44 is fit within an upper end of the housing 12 and positioned against a lower side of the piston rod guide 34. The ring 44 has an opening within which an annular seal 46 is disposed to sealingly receive the piston rod 32 and prevent escape of the damper fluid from the housing 12. A cup-shaped retainer 48 is disposed below the ring 44 to hold the ring 44 and the piston rod guide 34 within the housing 12. Part of the housing 12 is crimped as at 50 to securely hold the retainer 48 in position. The piston rod 32 is provided at its upper end with an end mounting (not shown). Although not shown, the end mounting has an opening for mounting an upper end of the piston rod 32 onto a frame of a vehicle.

Figure 2:
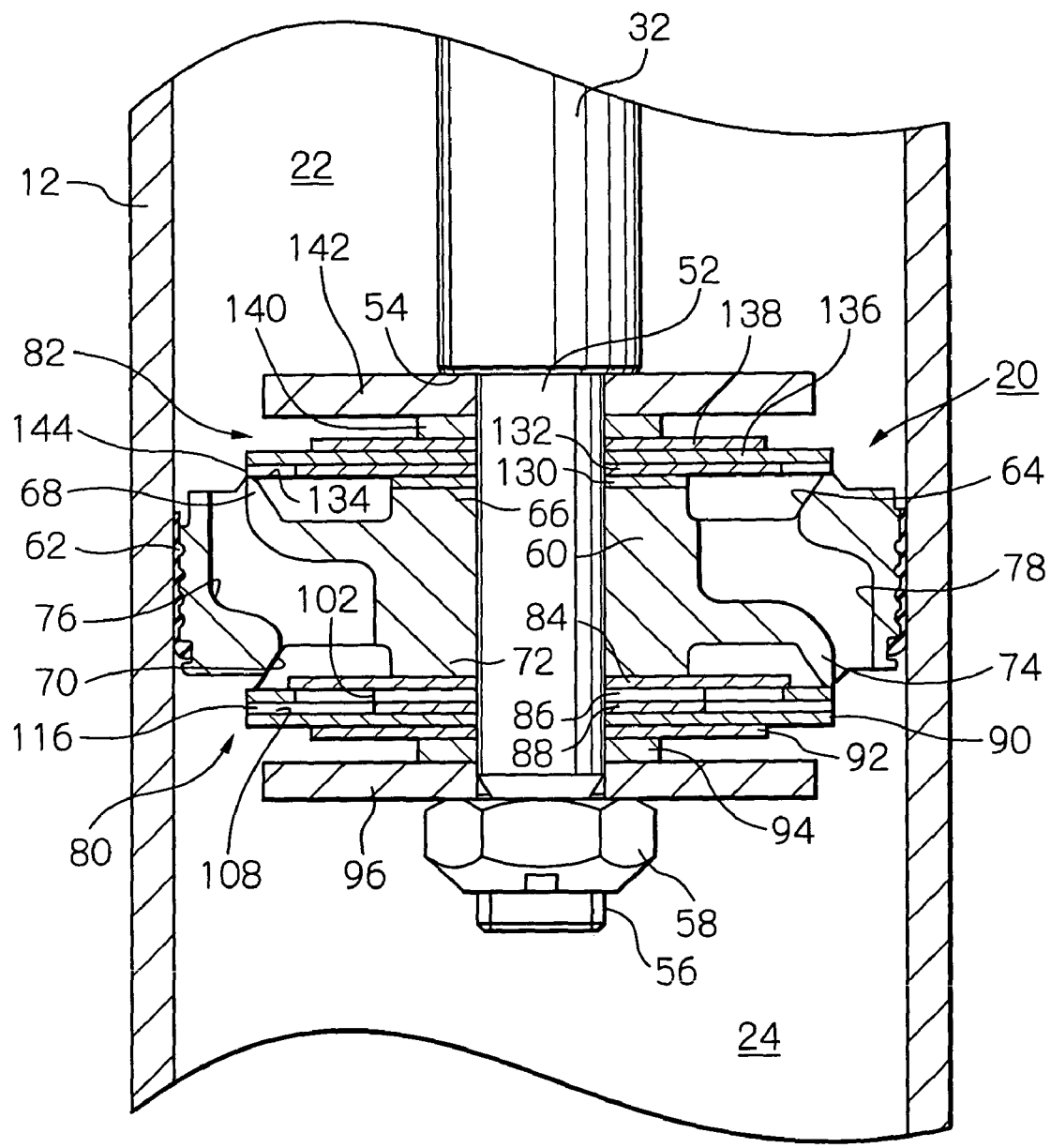
FIG. 2 is a partial sectional view, on an enlarged scale, of the hydraulic shock absorber shown in FIG. 1.

Referring to FIG. 2, the piston rod 32 has a coaxial extension 52 at its lower end. The extension 52 has a diameter less than that of the piston rod 32 so that an annular shoulder 54 is defined between a lower end of the piston rod 32 and the extension 52. The piston assembly 20 in its entirety is fit around the extension 52. The extension 52 has an end thread 56 at its free end. A locking nut 58 threadably engages the end thread 56 to secure the piston assembly 20 in position between the shoulder 54 and the nut 58.

The piston assembly 20 includes an annular piston element 60 fit around the extension 52 and sealingly and slidably engaged with an inner wall of the tubular housing 12 through an annular seal 62. An annular upper recess 64 is defined in an upper surface of the piston element 60 to form an annular upper central land 66 and an annular upper valve seat 68 located radially outwardly of the upper central land 66. The upper central land 66 is slightly less in height than the upper valve seat 68. Similarly, an annular lower recess 70 is defined in a lower surface of the piston element 60 to form an annular lower central land 72 and an annular lower valve seat 74 located radially outwardly of the lower central land 72. The lower central land 72 is slightly less in height than the lower valve seat 74. A plurality of rebound passages 76 extend from the upper surface of the piston element 60 and terminate in the lower recess 70. A plurality of compression passages 78 extend from the lower end of the piston element 60 and terminate in the upper recess 64. A rebound valve assembly 80 is retained on the lower surface of the piston element 60. A compression valve assembly 82 is retained on the upper surface of the piston element 60.

Figure 3:
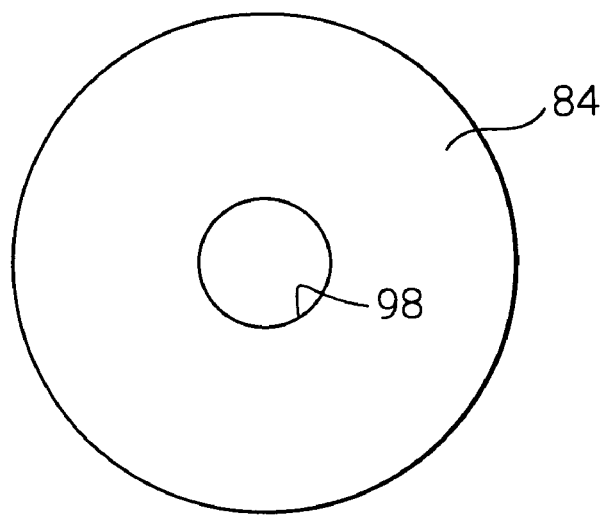
FIG. 3 is a plan view of a first rebound valve disc.
Figure 4:
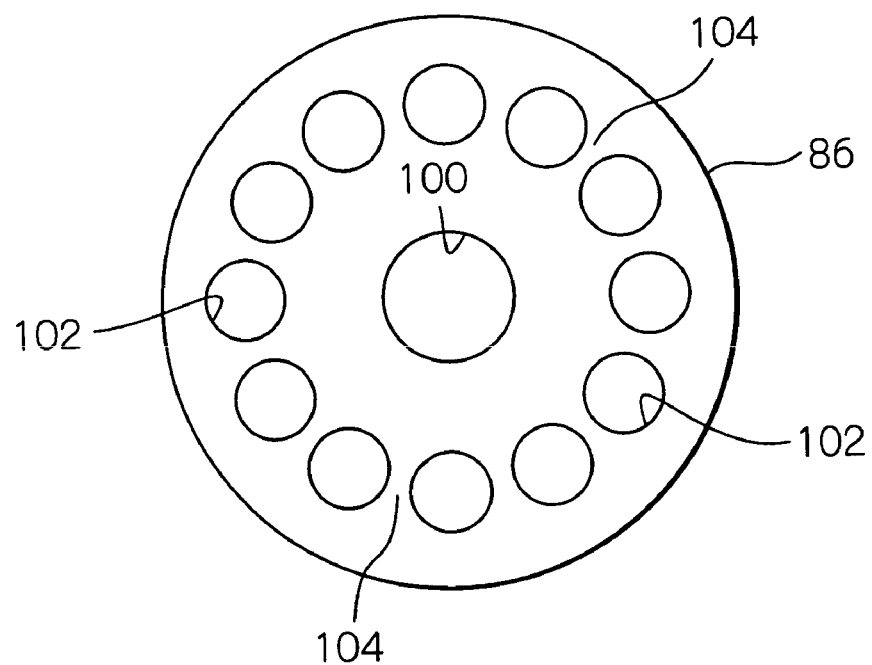
FIG. 4 is a plan view of a second rebound valve disc in which a circumferential series of apertures are formed.

The rebound valve assembly 80 includes annular first to fifth rebound valve discs 84, 86, 88, 90 and 92 arranged in a stack, an annular retainer 94 fit around the extension 52 of the piston rod 32 and adapted to define a spring force of the valve discs, and an annular stopper 96 interposed between the retainer 94 and the nut 58 and adapted to limit flexing of the valve discs. The first rebound valve disc 84 is positioned against the lower central land 72. As shown in FIG. 3, the first valve disc 84 has a central opening 98 to accommodate the extension 52 of the piston rod 32. The first valve disc 84 has a diameter slightly less than a diameter of the lower valve seat 74 so that an annular clearance is left between the first valve disc 84 and the lower valve seat 74. The annular clearance has a cross sectional area sufficiently larger than that of a fixed orifice, as will later be described in detail, and does not function as a restrictive orifice. The first valve disc 84 has a thickness substantially equal to a difference in axial length between the lower central land 72 and the lower valve seat 74. The second rebound valve disc 86 is superimposed on a lower surface of the first valve disc 84. The second valve disc 86 is greater in diameter than the first valve disc 84 and has an outer peripheral edge normally seated on the lower valve seat 74. As shown in FIG. 4, the second valve disc 86 has a central opening 100 to accommodate the extension 52 of the piston rod 32. The second valve disc 86 also includes a circumferential series of twelve circular apertures 102 arranged in a circumferentially equally spaced relationship and normally closed by the first valve disc 84. A diameter of the apertures 102 is approximately one seventh of the diameter of the second valve disc 86. A portion 104 of the second valve disc 86 which radially extends between adjacent apertures 102 serves as a bearing portion to support the first valve disc 84 particularly when the first valve disc 84 is urged against the second valve disc 86 during a high speed rebound stroke.

Figure 5:
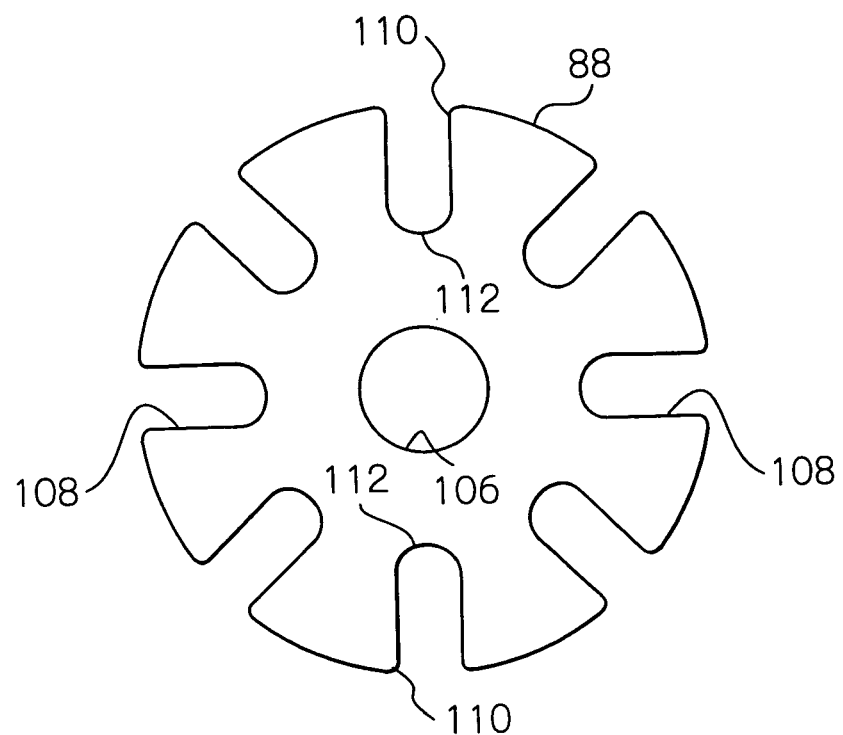
FIG. 5 is a plan view of a third rebound valve disc in which an array of notches are formed in its outer periphery.
Figure 6:
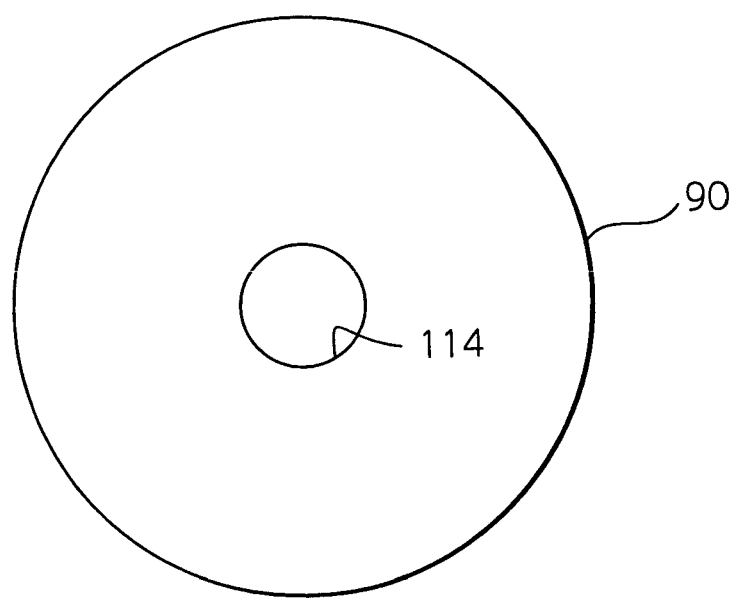
FIG. 6 is a plan view of a fourth rebound valve disc.

The third rebound valve disc 88 is superimposed on a lower surface of the second valve disc 86 and has the same diameter as that of the second valve disc 86. As shown in FIG. 5, the third valve disc 88 has a central opening 106 to accommodate the extension 52 of the piston rod 32. The third rebound valve disc 88 also includes an array of eight notches 108 arranged in a circumferentially equally spaced relationship. The notches 108 extend in a radial direction of the third valve disc 88 and have an arcuate outer end 110 and a semicircular inner end 112. As shown better in FIG. 2, a distance between a center of the third valve disc 88 and the inner end 112 of the notches 108 is substantially equal to a distance between a center of the second valve disc 86 and an inner end of the circular apertures 102. The notches 108 have a circumferential width approximately three fourths of the diameter of the apertures 102. The fourth valve disc 90 is positioned against a lower surface of the third valve disc 88 and has the same diameter as that of the second and third valve discs 86, 88. As shown in FIG. 6, the fourth valve disc 90 has a central opening 114 to accommodate the extension 52 of the piston rod 32. The fifth valve disc 92 is fit around the extension 52 of the piston rod 32 and is smaller in diameter than the first valve disc 84. The diameter of the fifth valve disc 92 may be changed so as to obtain a desired damping characteristic of the shock absorber. This damping characteristic may also be changed by increasing and decreasing a number of the fourth and fifth valve discs used.

Figure 7:
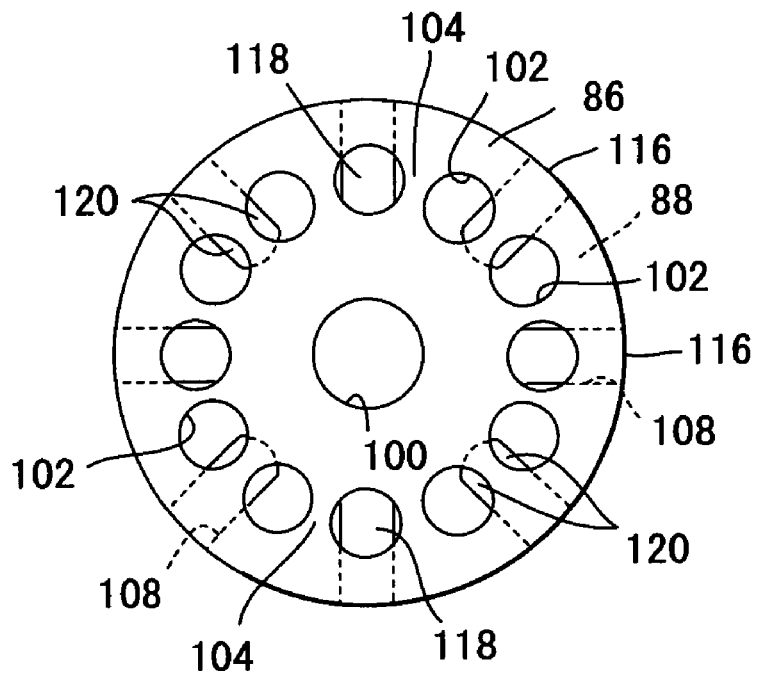
FIG. 7 is a plan view showing a manner by which the apertures in the second rebound valve disc are partly overlapped with the notches in the third rebound valve disc.
Figure 7A:
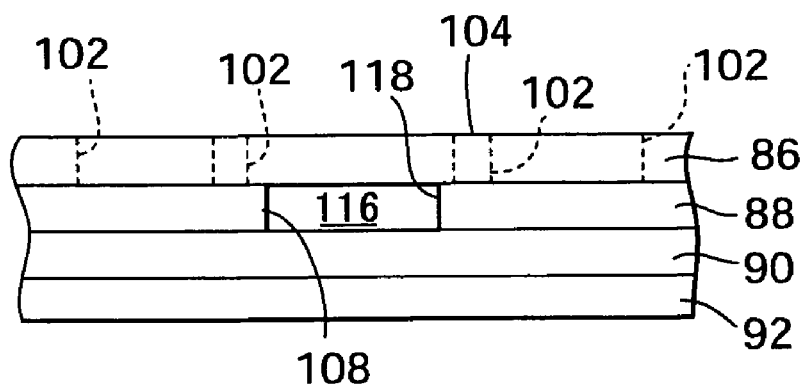
FIG. 7A is an enlarged front view, in part, of a valve assembly as viewed from the bottom of FIG. 7.
Figure 8:
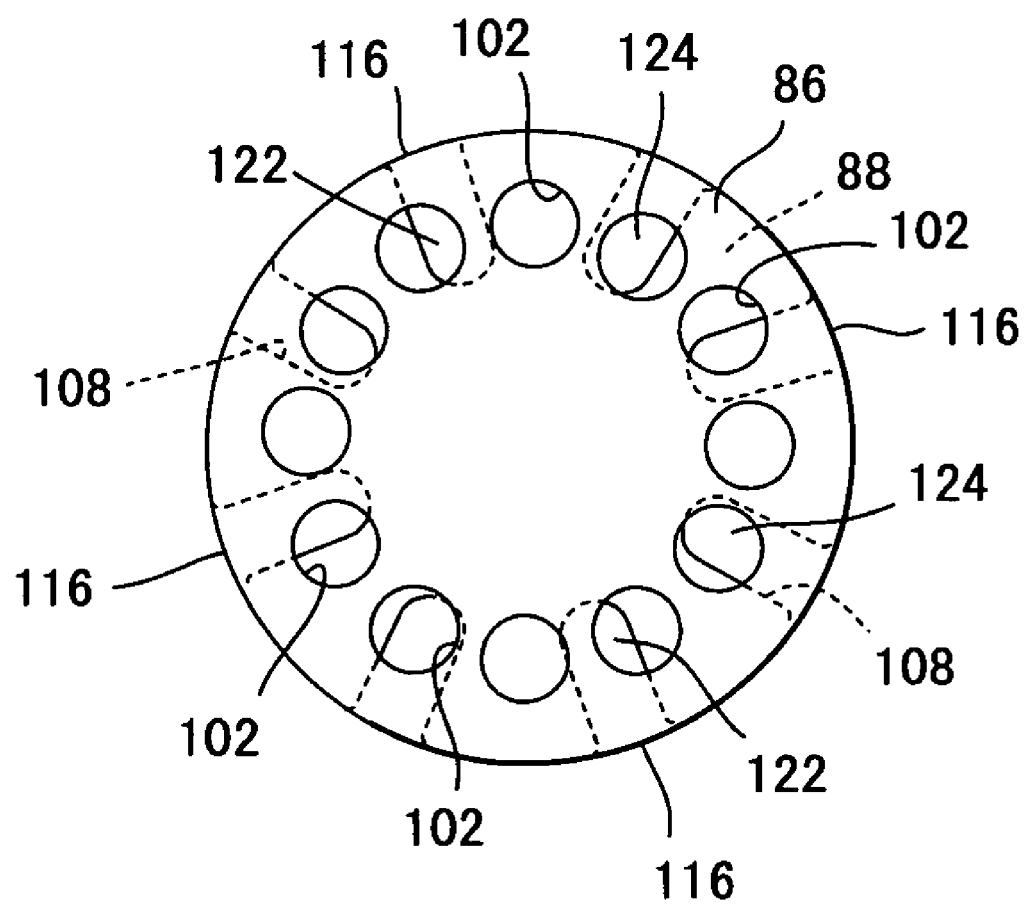
FIG. 8 is a view similar to that of FIG. 7, but showing that the third rebound valve disc is angularly moved on the second rebound valve disc in a counterclockwise direction from the position shown in FIG. 7.

With the third valve disc 88 sandwiched between the second valve disc 86 and the fourth valve disc 90, eight restrictive orifices 116 are defined in an outer end of the notches 108. The orifices 116 are constantly communicated with the compression chamber 24. Each of the restrictive orifices 116 has a cross sectional area which is determined by the product of a thickness of the third valve disc 88 and a width of the notches 108. In FIG. 7 four of the eight notches 108 are partly overlapped with four corresponding apertures 102 to form four ports 118. The ports 118 have a cross sectional area which is substantially greater than that of the restrictive orifices 116. The other four notches 108 are partly overlapped with the remaining eight apertures to form four pairs of ports 120. Each pair of ports 120 has a combined cross sectional area which is sufficiently greater than that of the restrictive orifices 116. In the embodiment shown in FIG. 8, the third valve disc 88 is slightly angularly moved on the second valve disc 86 in a counterclockwise direction from the position shown in FIG. 7. As shown, four of the eight notches 108 are partly overlapped with four of the twelve apertures 102 to form four ports 122. The ports have a cross sectional area which is greater than that of the restrictive orifices 116. Another four notches 108 are partly overlapped with another four apertures 102 to form four ports 124. The ports 124 have a cross sectional area which is greater than that of the restrictive orifices 116. In the embodiments shown in FIGS. 7 and 8, the cross sectional areas of the ports 118, 120, 122, 124 are sufficiently greater than the cross sectional area of the restrictive orifices 116 so that none of the ports functions as a restrictive orifice. As such, the total cross sectional area of the restrictive orifices determines an orifice-induced damping characteristic during compression.

Referring again to FIG. 2, the compression valve assembly 82 includes an annular first compression valve disc 130 fit around the extension 52 of the piston rod 32 and retained on the upper central land 66. The first compression valve disc 130 has substantially the same diameter as that of the upper central land 66. An annular second compression valve disc 132 is fit around the extension 52 of the piston rod 32 and positioned on the first valve disc 130. The second compression valve disc 132 has an outer peripheral edge normally seated on the upper valve seat 68. The second valve disc 132 is identical in thickness and diameter to that of the third rebound valve disc 88. The second compression valve disc 132 includes eight notches 134 arranged in a circumferentially equally spaced relationship. The notches 134 have the same circumferential width as that of the notches 108 of the third rebound valve disc 88, but have a radial length less than that of the notches 108. An annular third compression valve disc 136 is fit around the extension 52 of the piston rod 32 and held against the second valve disc 134. The third compression valve disc 136 has the same diameter as that of the second compression valve disc 132. An annular fourth compression valve disc 138 is superimposed on the third valve disc 136. The fourth compression valve disc 138 has a diameter less than that of the third valve disc 136. The diameter of the fourth compression valve disc 138 may be changed so as to establish a desired damping characteristic through the compression valve assembly when the piston assembly is moved into the compression chamber 24. This characteristic may also be changed by increasing and decreasing a number of the third and fourth valve discs 136, 138 used.

An annular retainer 140 is fit around the extension 52 of the piston rod 32 and positioned against the fourth compression valve disc 138. The retainer 140 defines a spring force of the compression valve assembly 82 and provides a fulcrum at which the compression valve assembly 82 can be deflected. An annular stopper 142 is fit around the extension 52 of the piston rod 32 and interposed between the shoulder 54 of the piston rod 32 and the retainer 140. The stopper 142 limits flexing of the compression valve assembly 82.

With the second valve disc 132 placed between the upper valve seat 68 and the third valve disc 136, eight restrictive orifices 144 are defined in an outer end of the notches 134. The orifices 144 are constantly communicated with the rebound chamber 22. The orifices 144 have a cross sectional area which is determined by the product of a thickness of the second valve disc 132 and a width of the notches 134. The total cross sectional area of the eight restrictive orifices 144 determines an orifice-induced damping characteristic during compression and rebound. In the embodiment shown in FIGS. 1 to 7, the total cross sectional area of the restrictive orifices 116 is identical to the total cross sectional area of the restrictive orifices 144. Alternatively, the total cross sectional area of the restrictive orifices 116 and the total cross sectional area of the restrictive orifices 144 may be varied to provide different tuning between compression and rebound movement of the shock absorber.

In use, the piston assembly 20 reciprocates within the piston housing 12 during compression and rebound movement of the shock absorber 10. At this time, the damping fluid is forced through the several restrictive orifices and passages to dampen the compression and rebound movement.

More specifically, during an extremely low velocity compression stroke, a pressure differential between the rebound chamber 22 and the compression chamber 24 is so small that the compression valve assembly 82 remains in its seated position, and the first rebound valve disc 84 is held against the second rebound valve disc 86 to close off all the apertures 102 in the second rebound valve disc 86. Thus, compression flow is routed only through the restrictive orifices 144.

Figure 9:
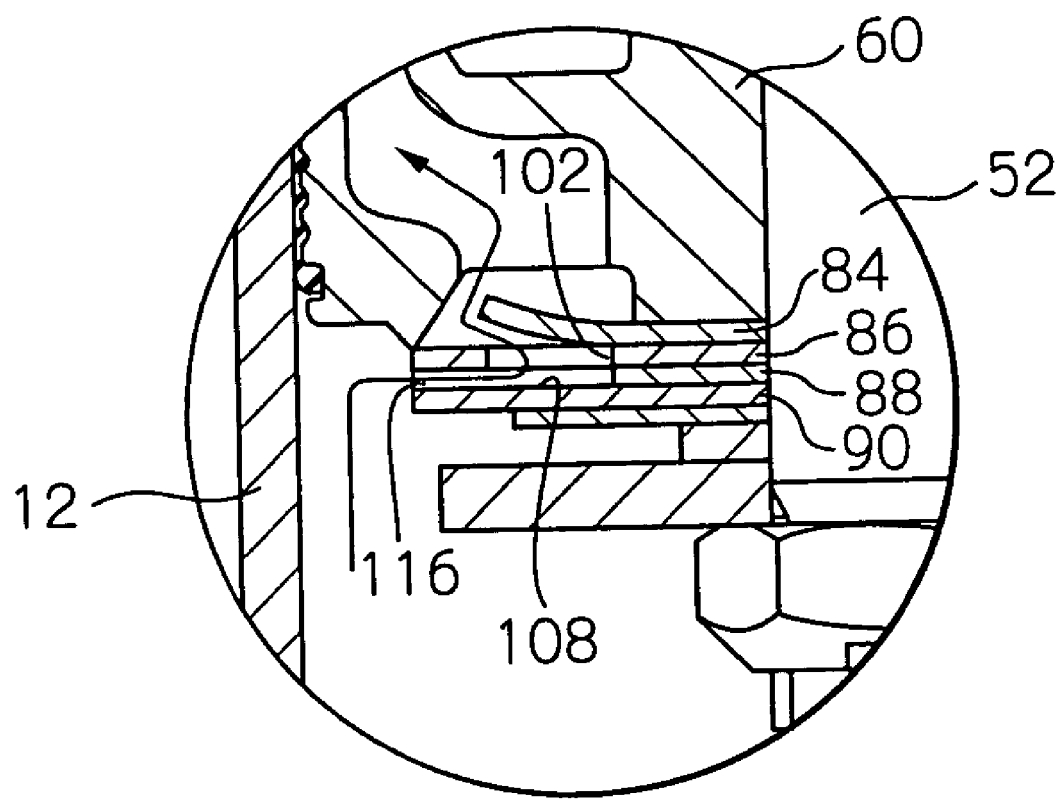
FIG. 9 is a partial sectional view of a piston assembly, showing a manner by which the first rebound valve disc is deflected during a compression stroke.

As the piston assembly is moved slightly faster, but still at a relatively low compression rate, a pressure differential across the rebound valve assembly 80 increases to a level sufficient to deflect or open the first rebound valve disc 84. As shown by the arrow in FIG. 9, damping fluid is caused to flow from the compression chamber 24 to the rebound chamber 22 first through the restrictive orifices 116 and then the ports overlappingly formed between the apertures 102 and the notches 108. This combination (flow through the restrictive orifices 116 and flow through the ports as the first rebound valve disc 84 is opened) improves a damping function of the shock absorber at low compression rates. At this time, the compression valve assembly 82 still remains in its seated position. As such, damping fluid will flow only through the restrictive orifices 144.

During a high velocity compression stroke, pressure in the compression chamber 24 unseats the compression valve assembly 82 from the upper valve seat 68 to allow a substantial part of the damping fluid to flow from the compression chamber 24 to the rebound chamber 22 through between the upper valve seat 68 and the compression valve assembly 82. This provides a greater valve-induced damping force.

During a low velocity rebound stroke wherein the piston assembly 20 is returned to the rebound chamber 22, a pressure differential between the compression chamber 24 and the rebound chamber 22 is so small that the rebound valve assembly 80 remains in its seated position. Thus, rebound flow is routed only through the restrictive orifices 144.

During a high velocity rebound stroke, a pressure differential across the rebound valve assembly 80 is so large that the rebound valve assembly 80 is unseated from the lower valve seat 74. This allows damping fluid to flow from the rebound chamber 22 to the compression chamber 24 through between the lower valve seat 74 and the rebound valve assembly 80. This gives the shock absorber a high valve-induced damping force.

At relatively high rebound rates, relatively high back pressure is exerted on the first rebound valve disc 84. Deformation of the first rebound valve disc 84 is, however, minimized since a non-apertured region 104 of the second rebound valve disc 86 supports the first rebound valve disc 84. The first rebound valve disc 84 may be slightly deformed around the apertures 102 of the second rebound valve disc 86 when back pressure or stress is exerted on the first rebound valve disc 84. Advantageously, this stress is evenly dispersed along and around circumferences of the apertures 102 as the apertures 102 are circular in shape. This arrangement permits a wide variety of tuning features. For example, the first rebound valve disc 84 may be made thinner. Also, another valve disc may alternatively be superimposed on the first rebound valve disc 84.

The cross sectional area of each restrictive orifice 116 is less than the cross sectional area of the ports, regardless of a relative angular position between the second rebound valve disc 86 and the third rebound valve disc 88. This makes it easier to assemble the shock absorber without need for a special tool.

Figure 10:
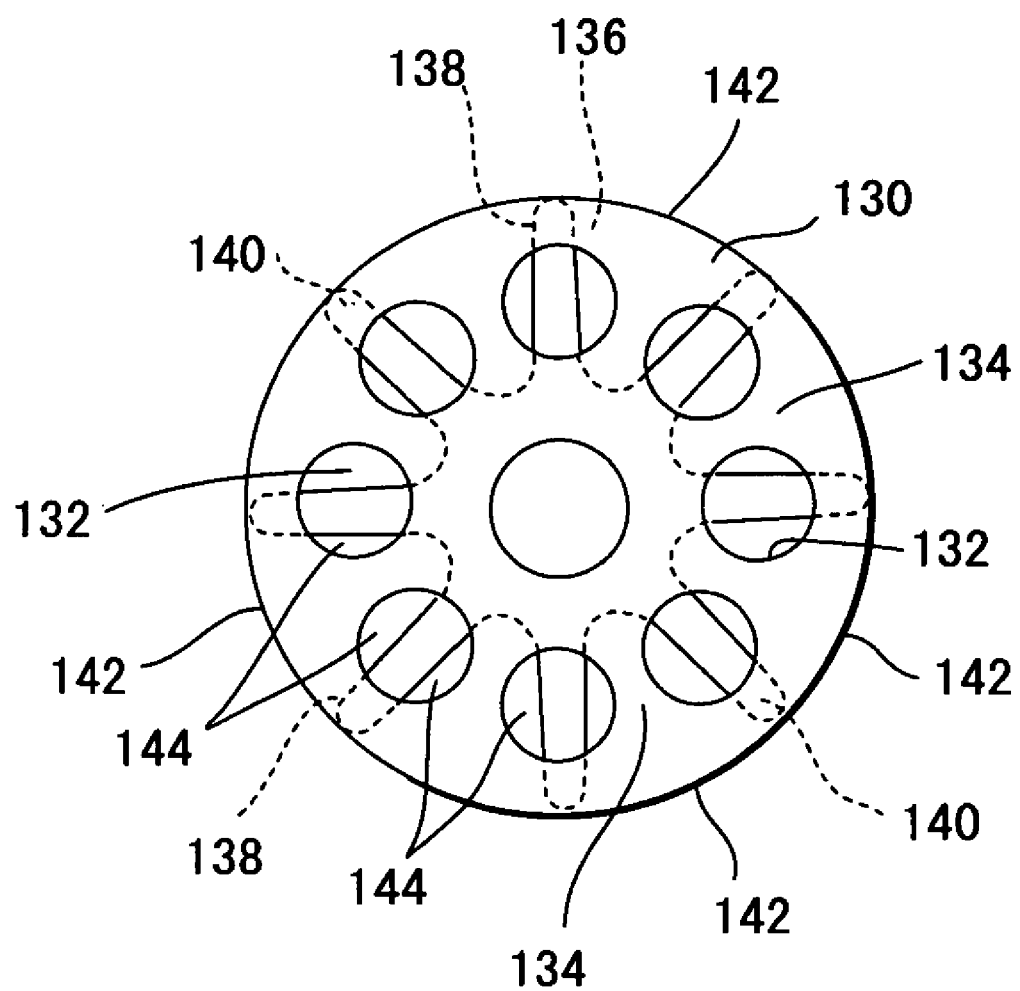
FIG. 10 is a plan view of a modified form of the second and third rebound valve discs shown in FIG. 7.

FIGS. 10 to 13 show modified forms of the second and third rebound valve discs 86, 88. Referring to FIG. 10, an annular second, apertured valve disc 130 includes a circumferential series of eight circular apertures 132 arranged in a circumferentially equally spaced relationship, and eight non-apertured regions 134 located between adjacent apertures 132 and adapted to support the first rebound valve disc 84 during flexing of the first rebound valve disc 84 in response to fluid flow during rebound and compression movement of the piston assembly. An annular third, notched valve disc 136 includes a circumferential series of eight sectorial notches 138, and a corresponding array of radial fingers or non-notched regions 140 located between adjacent notches 138. Eight restrictive orifices 142 are formed in an outer end of the notches 138 when the third rebound valve disc 136 is sandwiched between the second rebound valve disc 130 and the fourth rebound valve disc 90. With the third rebound valve disc 136 superimposed on the second rebound valve disc 130, the radial fingers 140 are located in respective apertures 132 to close part of the apertures 132 and divide each aperture 132 into a pair of semicircular apertures. Each pair of semicircular apertures cooperates with adjacent notches 138 to form a pair of separate ports 144. A diameter and radial position of the apertures 132, a width of the fingers 140 and a shape of the notches 138 are determined so that a cross sectional area of each restrictive orifice 142 is less than a combined cross sectional area of each pair of ports 144 regardless of a relative angular position between the second and third rebound valve discs 130, 136.

Figure 11:
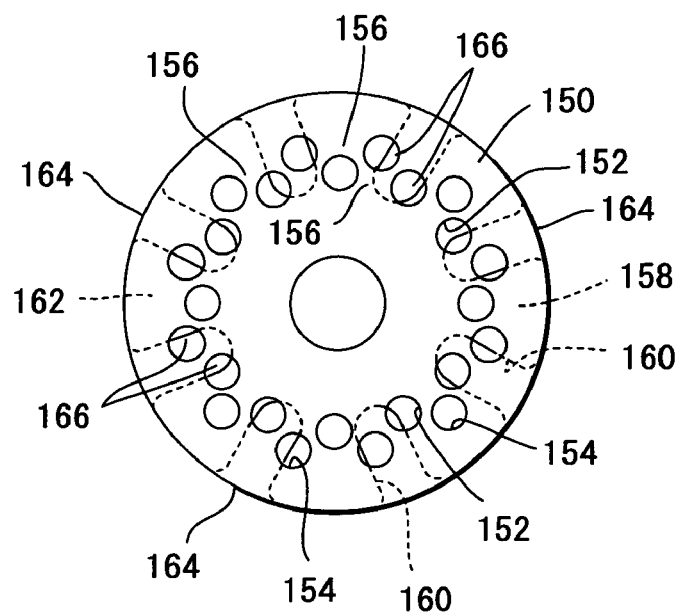
FIG. 11 is a plan view of another modified form of the second and third rebound valve discs.

Referring to FIG. 11, an annular second, apertured valve disc 150 includes a first circumferential series of twelve circular apertures 152 arranged in a circumferentially equally spaced relationship and a second circumferential series of twelve circular apertures 154 arranged in a circumferentially equally spaced relationship and located radially outwardly of the first apertures 152. The second apertures 154 are angularly displaced from the first apertures 152 so that each second aperture 154 is positioned between adjacent first apertures 152. This arrangement leaves non-apertured regions 156 between adjacent first apertures, between adjacent second apertures, and between adjacent first and second apertures. An annular third, notched valve disc 158 includes a series of eight radial notches 160 arranged at equal intervals, and an array of tines or non-notched regions 162 between adjacent notches 160. Eight restrictive orifices 164 are formed in an outer end of the notches 160 when the third rebound valve disc 158 is sandwiched between the second rebound valve disc 150 and the fourth rebound valve disc. With the third rebound valve disc 158 superimposed on the second rebound valve disc 150, each of the notches 160 is partly overlapped with respective first and second apertures 152, 154 to form a pair of separate ports 166. A diameter and radial position of the apertures 152, 154 and a width of the notches 160 are determined so that a cross sectional area of each restrictive orifice 164 is less than a combined cross sectional area of each pair of ports 166 regardless of a relative angular position between the second and third rebound valve discs 150, 158.

Figure 12:
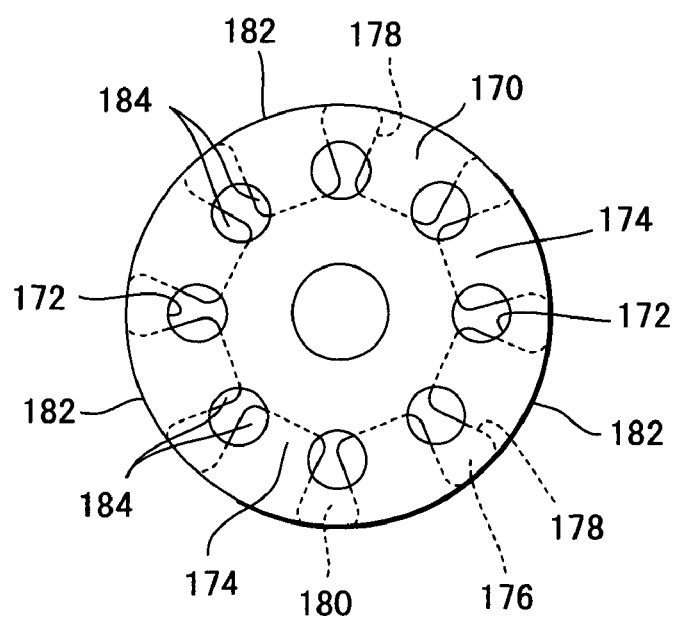
FIG. 12 is a plan view of a further modified form of the second and third rebound valve discs.

Referring to FIG. 12, an annular second, apertured valve disc 170 includes a circumferential series of eight circular apertures 172 arranged in a circumferentially equally spaced relationship, and eight non-apertured regions 174 located between adjacent apertures 172 and adapted to support the first rebound valve disc 84 during flexing of the first rebound valve disc in response to fluid flow during rebound and compression movement of the piston assembly. An annular third, notched valve disc 176 includes a circumferential series of eight generally rectangular notches 178, and a corresponding array of radial fingers or non-notched regions 180 located between adjacent notches 178. Eight restrictive orifices 182 are formed in an outer end of the notches 178 when the third rebound valve disc 176 is sandwiched between the second rebound valve disc 170 and the fourth rebound valve disc. With the third rebound valve disc 176 superimposed on the second rebound valve disc 170, the radial fingers 180 are located in the respective apertures 172 to close part of the apertures 172 and divide each aperture into two small apertures. Each pair of small apertures cooperates with the adjacent notches 178 to collectively form a pair of separate ports 184. A diameter and radial position of the apertures 172, a width of the fingers 180 and a shape of the notches 178 are determined so that a cross sectional area of each restrictive orifice 182 is less than a combined cross sectional area of each pair of ports 184 regardless of a relative angular position between the second rebound valve disc 170 and the third rebound valve disc 176.

Figure 13:
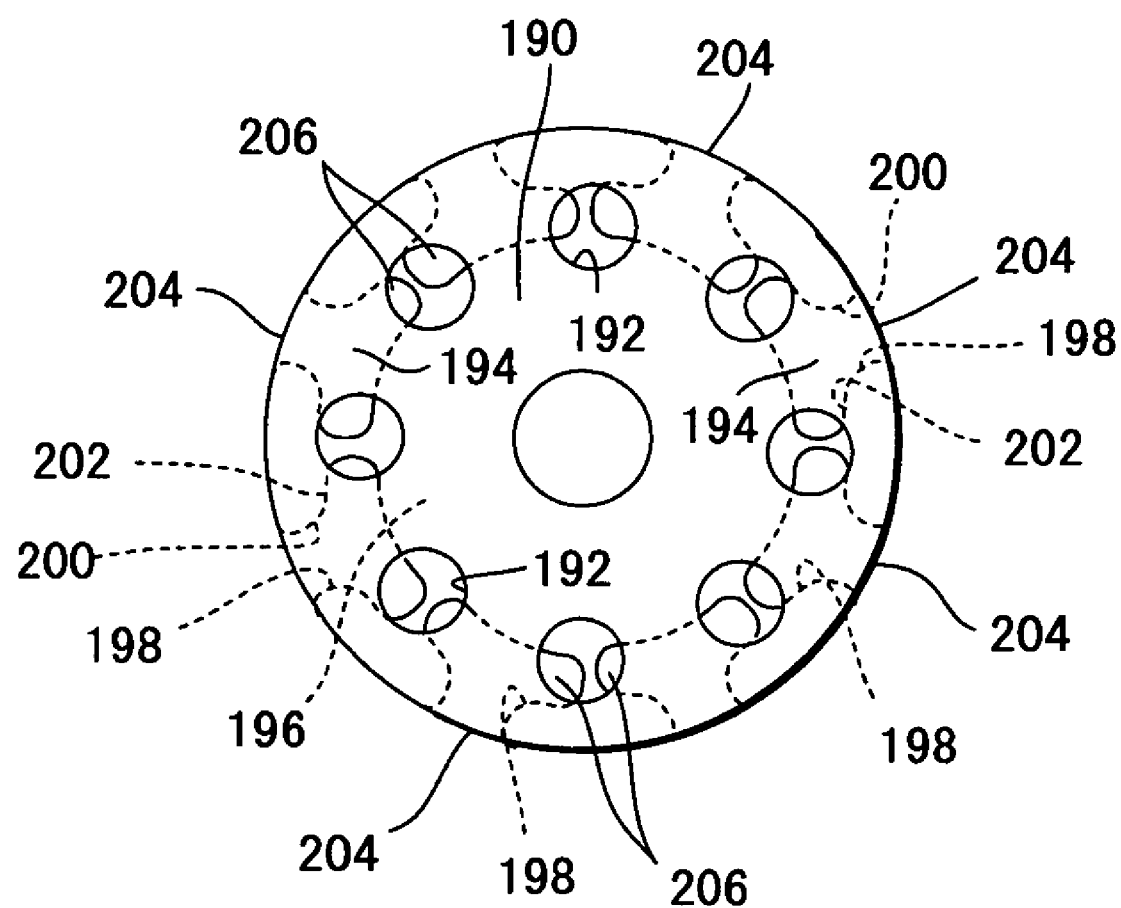
FIG. 13 is a plan view of another modified form of the second and third rebound valve discs.
Figure 14:
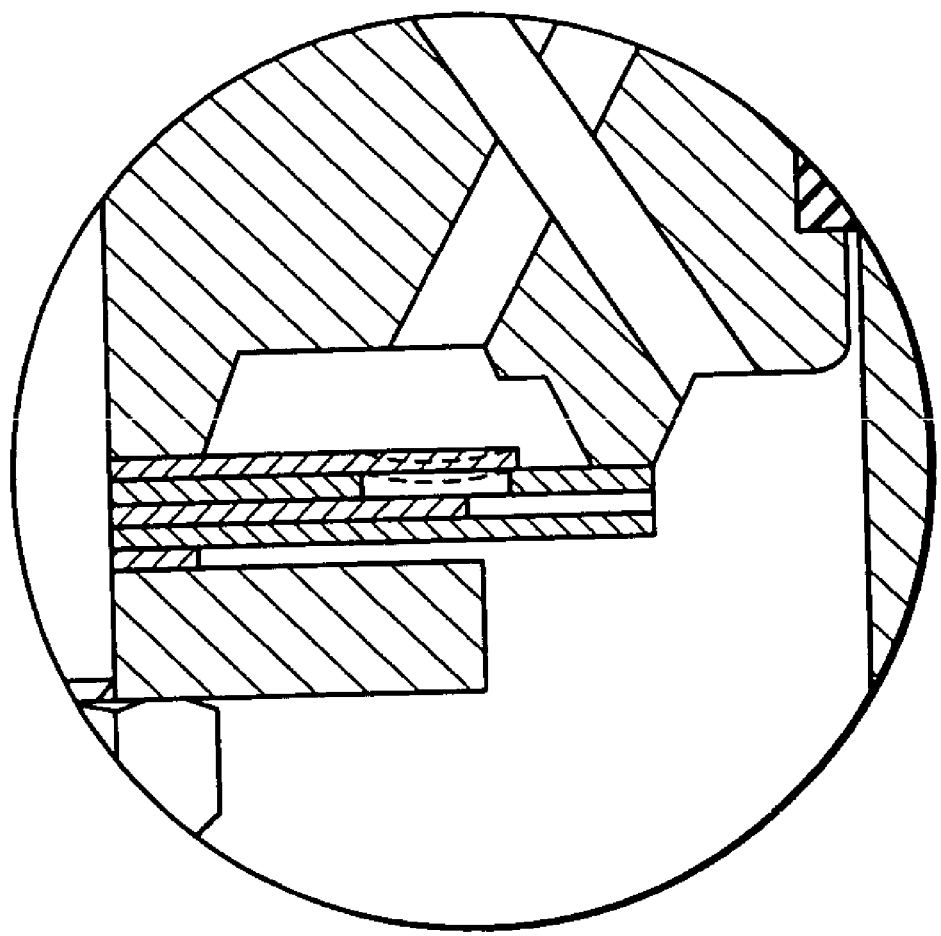
FIG. 14 is a partial sectional view of a conventional hydraulic shock absorber.
Figure 15:
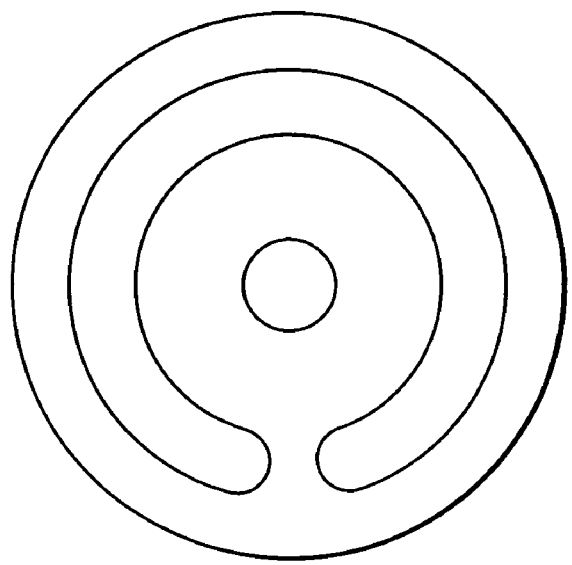
FIG. 15 is a plan view of an apertured valve disc shown in FIG. 14.
Figure 16:
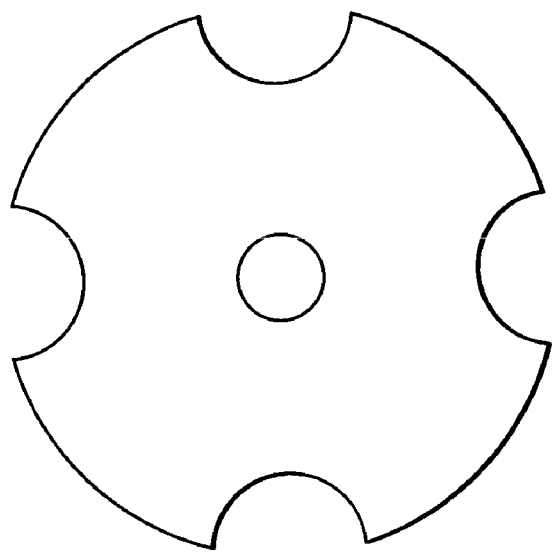
FIG. 16 is a plan view of a notched valve disc shown in FIG. 14.
Figure 17:
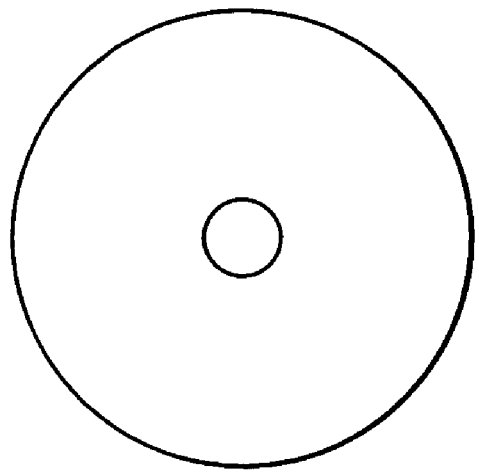
FIG. 17 is a plan view of an annular outer valve disc shown in FIG. 14.
Figure 18:
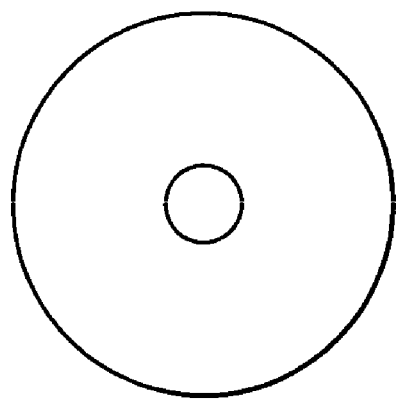
FIG. 18 is a plan view of an annular inner valve disc shown in FIG. 14.

Referring to FIG. 13, an annular second, apertured valve disc 190 includes a circumferential series of eight circular apertures 192 arranged in a circumferentially equally spaced relationship, and eight non-apertured regions 194 located between adjacent apertures 192 and adapted to support the first rebound valve disc during flexing of the first rebound valve disc in response to fluid flow during rebound and compression movement of the piston assembly. An annular third, notched valve disc 196 includes a corresponding array of eight notches 198 arranged in a circumferentially equally spaced relationship. The notches 198 have a generally T-shape and each include a radial notch region 200 and a circumferential notch region 202 connected to an inner end of the radial notch region 200. Eight restrictive orifices 204 are defined in an outer end of the radial notch region 200 of the notches 198 when the third rebound valve disc 196 is sandwiched between the second and fourth rebound valve discs. With third rebound valve disc 196 superimposed on the second rebound valve disc 190, each of the apertures 192 is partly overlapped with adjacent ends of the circumferential notch region 202 of each notch 198 to collectively define a pair of separate ports 206. A diameter of the apertures 192 and a shape of the notches 198 are determined so that a cross sectional area of each restrictive orifice 204 is less than a combined cross sectional area of each pair of ports 206 regardless of a relative angular position between the second and third rebound valve discs 190, 196.

The modified valve discs shown in FIGS. 10 to 13 offer the same advantageous effect as those shown in FIGS. 1 to 9. Particularly, in the valve discs shown in FIGS. 10, 12 and 13, all the apertures are in constant communication with respective notches regardless of the relative angular position between the second and third rebound valve discs. In other words, the first rebound valve disc can have a constant area on which fluid pressure is exerted. This arrangement allows safe opening of the first rebound valve disc and prevents damping fluctuations during a low velocity compression stroke. This gives occupants of a vehicle a more comfortable ride since the occupants are sensitive to such damping fluctuations.

The first rebound valve disc functions as a spring and when opened, provides a valve-induced damping characteristic. Alternatively, the first rebound valve disc may be in the form of a check valve. Such an arrangement provides independent tuning features during compression and rebound strokes.

Illustratively, the apertures of the second rebound valve disc are arranged in a circumferentially equally spaced relationship. Alternatively, a plurality of pairs or sets of apertures may be arranged in the same manner or at given intervals. The apertures shown in FIGS. 1 to 13 are all circular in shape. Alternatively, the apertures may take a triangular, rectangular or other polygonal shape in case that a relatively rigid first valve disc can be employed for a desired tuning of the shock absorber.

In the foregoing embodiments, the second apertured valve disc, the third notched valve disc and the fourth valve disc have the same diameter. Alternatively, the third valve disc and/or the fourth valve disc may have a diameter less than that of the second valve disc so long as the restrictive orifices are formed when the third notched valve disc is sandwiched between the second apertured valve disc and the fourth valve disc. The first to fourth rebound valve discs are used as a tuning feature to produce a greater damping force during compression. The compression valve assembly may be arranged in the same manner as the rebound valve assembly. Such an arrangement can widely vary tuning of the shock absorber during rebound.

In the illustrated embodiments, the shock absorber is composed of a single pressure tube. As an alternative, the shock absorber may be composed of twin pressure tubes. Illustratively, the present invention is applied to an automotive shock absorber. It is to be understood that the present invention is equally applicable to trains, washing machines, buildings and other vibratory objects.

Although the present invention has been described with respect to its preferred embodiments, the present invention is not limited to the illustrated embodiments. For example, the rebound and compression passages may be defined in a wall of the cylindrical housing. Still alternatively, the valve assemblies may be externally attached to the cylindrical housing, and the rebound and compression passages may thus extend outside of the cylindrical housing. It is to be understood that other modifications and changes may be made without departing from the scope of the invention as defined by the appended claims.

What is claimed is:

1. A shock absorber comprising:
    a cylindrical housing adapted to be filled with a damping fluid, said cylindrical housing having an interior;
    a piston slidably disposed within said cylindrical housing to divide the interior of said cylindrical housing into an upper working chamber and a lower working chamber;
    a passage extending between said upper and lower working chambers and adapted to selectively allow the damping fluid to flow therethrough during movement of said piston, said passage having an upstream end and a downstream end;
    a valve seat located adjacent to said downstream end of said passage; and
    a valve assembly operable to selectively open and close said passage during movement of said piston, said valve assembly including
        (i) a first valve disc held on and deflectable toward said piston, and separated from said valve seat,
        (ii) a second valve disc on said first valve disc and normally seated on said valve seat, said second valve disc including circular apertures arranged in a circumferentially spaced relationship and selectively openable and closable by said first valve disc,
        (iii) a third valve disc on said second valve disc and having notches arranged in a circumferentially spaced relationship, said notches each having an inner end and an outer end and cooperating with said circular apertures to form ports, said ports being constantly communicated with one of said upper and lower working chambers that is located downstream of said valve seat; and
        (iv) a fourth valve disc cooperating with said second valve disc to sandwich said third valve disc so that restrictive orifices are defined at the outer end of each of said notches, wherein said ports each have a cross sectional area greater than a cross sectional area of each of said restrictive orifices, regardless of a relative angular position between said second and third valve discs.

2. The shock absorber according to claim 1, wherein said apertures are equally spaced from one another, and said notches are equally spaced from one another, with said apertures all being communicated with said notches regardless of a relative angular position between said second and third valve discs.

3. The shock absorber according to claim 1, wherein said circular apertures include first circular apertures arranged in a circumferentially equally spaced relationship and second circular apertures arranged in a circumferentially equally spaced relationship, with said second circular apertures being located radially outwardly from said first circular apertures, and with said second circular apertures being angularly displaced from said first circular apertures so that each one of said second circular apertures is positioned between adjacent ones of said first circular apertures.

4. A piston assembly for a shock absorber, the shock absorber including a cylindrical pressure tube filled with a damping fluid, said piston assembly comprising:

an annular piston element adapted to be slidably disposed within the pressure tube and connected to a piston rod, said piston element including an upper valve seat and a lower valve seat;

a first annular valve disc being deflectable toward and positioned against one side of said annular piston element, and having an outer peripheral edge spaced from said lower valve seat;

a second annular valve disc retained on said first annular valve disc and having an outer peripheral edge to be selectively seated on and unseated from said lower valve seat, said second annular valve disc including circular apertures arranged in a circumferentially spaced relationship;

a third annular valve disc retained on said second annular valve disc and having notches arranged in a circumferentially spaced relationship, said notches each having an inner end and an outer end and cooperating with said circular apertures to form ports; and a fourth valve disc cooperating with said second annular valve disc to sandwich said third annular valve disc so that restrictive orifices are defined at the outer end of each of said notches, said ports each having a cross sectional area greater than a cross sectional of each of said restrictive orifices regardless of a relative angular position between said second and third annular valve discs.

5. The piston assembly according to claim 4, wherein said apertures are equally spaced from one another, and said notches are equally spaced from one another, with said apertures all being communicated with said respective notches regardless of a relative angular position between said second and third annular valve discs.

6. The piston assembly according to claim 4, wherein said circular apertures include first circular apertures arranged in a circumferentially equally spaced relationship and second circular apertures arranged in a circumferentially equally spaced relationship, with said second circular apertures being located radially outwardly from said first circular apertures, and with said second circular apertures being angularly displaced from said first circular apertures so that each one of said second circular apertures is positioned between adjacent ones of said first circular apertures.

* * * * *